Patented June 6, 1950

2,510,847

UNITED STATES PATENT OFFICE 2,510,847

DISTILLATION OF POLYMERIZABLE DIOLEFINS

Samuel W. Wilson, Baton Rouge, La., assignor to Standard Oil Development Company, a corporation of Delaware No Drawing. Application March 21, 1946, Serial No. 656,147

3 Claims. (Cl. 202—57)

This invention relates to the distillation of easily polymerizable compounds, and in particular to inhibiting the polymerization during distillation, heating, condensing, storing, or accumulation of hydrocarbon mixtures containing mono- and diolefins, sulfur, and/or sulfur-containing compounds.

The purification by distillation of easily polymerizable compounds such as the lower molecular weight unsaturated hydrocarbons is usually beset with operating difficulties due to the deposition of polymers in and on the processing equipment, causing mechanical difficulties and loss of heat transfer in heat exchanger equipment. These difficulties occur, in the case of the lower aliphatic mono- and diolefins and sulfur-containing compounds, in the processing equipment wherein these compounds are vaporized and condensed such as the towers, reboilers, condensers and reflux drums. Moreover, many of these polymerization reactions are auto-catalytic, and added difficulty is thereby presented of endeavoring to prevent the formation of even a trace of the polymer. The present invention is concerned with the use of inhibitors to repress polymer formation in the purification of the low molecular weight hydrocarbons containing olefins, sulfur and sulfur compounds which often occur as contaminants of desirable low molecular weight unsaturates.

It has been found that when certain amino-compounds, and particularly aromatic amines, are injected into the hydrocarbon stream containing the lower molecular weight aliphatic conjugated diolefins at the point in the processing equipment at which the mixture is completely in the liquid phase for the first time under pressure and temperature, repression of polymer formation is particularly effective. The amino-compounds which have been especially effective in this regard with hydrocarbon mixtures containing such conjugated diolefins as butadiene, isoprene, the piperylenes and related $C_5$ hydrocarbons, are the aromatic amines of bi-nuclear structure such as the naphthylamines, and particularly phenyl - beta - naphthylamine. Thus, when small quantities, such as 0.28% by weight of phenyl-beta-naphthylamine, were added (to a mixture of $C_3$, $C_4$ and heavier hydrocarbons) as feed supply to a stabilizer unit, the amount of polymer formed was considerably reduced. Moreover, the polymer formed in the presence of the aromatic amine is more soluble in aromatic solvents and lighter in color than that formed in the absence of the aromatic amines. The concentrations of the aromatic amine found to be effective vary from 0.0005% to 1.5%. In this connection, a light gas oil containing 0.028% by weight of phenyl-beta-naphthylamine was found particularly effective for purging the inner walls of stabilizer and reboiler equipment.

A further improvement in processing as regards inhibiting polymer formation was found to occur when a mixture of inhibitors was added to the liquid hydrocarbon mixtures containing the $C_4$ to $C_6$ conjugated diolefins prior to distillation treatment. It has been found that a mixture of aromatic amines and phenols reduces polymer formation to a considerable extent. Thus, the phenols, especially those of bi-nuclear structure, such as alpha-naphthol, in admixture with aromatic amines, and particularly the aromatic amines of bi-nuclear structure, were found to give superior inhibitory effect over that of either compound alone in the treatment by distillation of low molecular weight, easily polymerizable hydrocarbons. The amount of the phenolic compound is usually in the range of about 20% that of the aromatic amine, but may be more or less.

When 0.25% by weight of phenyl-beta-naphthylamine and 0.05% by weight of alpha-naphthol were added to the lean oil feed supply to a stabilized unit processing a mixture of $C_3$ to $C_6$ hydrocarbons, polymer formation was considerably reduced. Thus, for example, continuous stabilized operation was maintained for 140 days in the presence of the mixture of the inhibitors in this concentration, whereas in the absence of the mixture, difficulty was experienced after 40 days' operation. Furthermore, the heat transfer coefficient on heat exchange equipment attached to the stabilizer unit was found to decrease to the extent of only 8% in eleven days as compared to 35% in fifteen days when no inhibitory compounds were added.

The addition of the inhibitor compounds of this invention may be made to the distillation system at any convenient location. It is preferable, however, to introduce the inhibitors into the system at the point at which the hydrocarbon feed is in the liquid phase for the first time. Thus, in plant operation the inhibitors have been added into the total reflux drum, thus controlling polymer formation in the upper section of the distillation tower. In this manner, polymer formation in the distillation of stocks containing butadiene, isoprene and the related $C_5$ diolefins has been so substantially reduced as to at least double the operating periods for satisfactory processing over that usually attained in the absence of the inhibitor compounds of this invention.

What is claimed is:

1. The improvement in the recovery of diolefinic hydrocarbons of 4 to 6 carbon atoms by fractional distillation of hydrocarbon mixtures containing them, traces of sulfur and sulfur compounds and other hydrocarbons polymerizable by traces of sulfur and sulfur compounds which comprises fractionally distilling such hydrocarbon mixtures in the presence of a polymerization inhibitor consisting of a mixture of an amine of a bi-nuclear aromatic hydrocarbon and a hydroxy bi-nuclear aromatic hydrocarbon.

2. The improvement in the recovery of diolefinic hydrocarbons of 4 to 6 carbon atoms by fractional distillation of hydrocarbon mixtures containing them, traces of sulfur and sulfur compounds and other hydrocarbons polymerizable by traces of sulfur and sulfur compounds which comprises fractionally distilling such hydrocarbon mixtures in the presence of a polymerization inhibitor consisting of a mixture of phenyl-beta-naphthylamine and alpha-naphthol.

3. The process according to claim 1 in which the hydrocarbon mixture undergoing distillation contains 0.25% by weight of phenyl-beta-naphthylamine and 0.05% by weight of alpha-naphthol based on the weight of hydrocarbon.

SAMUEL W. WILSON.

REFERENCES CITED

The following references are of record in the file of this patent:

UNITED STATES PATENTS

| Number | Name | Date |
|---|---|---|
| 2,361,538 | Franz | Oct. 31, 1944 |
| 2,388,041 | Craig | Oct. 30, 1945 |